United States Patent
Aoki

(10) Patent No.: US 8,947,815 B2
(45) Date of Patent: Feb. 3, 2015

(54) DISK STORAGE APPARATUS AND DATA STORAGE METHOD

(71) Applicant: Kabushiki Kaisha Toshiba, Minato-ku (JP)

(72) Inventor: Masatoshi Aoki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/955,160

(22) Filed: Jul. 31, 2013

(65) Prior Publication Data

US 2014/0285923 A1 Sep. 25, 2014

(30) Foreign Application Priority Data

Mar. 19, 2013 (JP) .................. 2013-056854

(51) Int. Cl.
  *G11B 5/02* (2006.01)
  *G11B 33/14* (2006.01)
(52) U.S. Cl.
  CPC ...................... *G11B 33/14* (2013.01)
  USPC ............... 360/55; 360/48; 360/39; 360/53
(58) Field of Classification Search
  None
  See application file for complete search history.

(56) References Cited

U.S. PATENT DOCUMENTS

| 8,599,510 B1 * | 12/2013 | Fallone ........................... 360/48 |
| 2011/0116186 A1 * | 5/2011 | Jen et al. ......................... 360/75 |
| 2011/0292538 A1 | 12/2011 | Haga et al. |
| 2013/0031406 A1 * | 1/2013 | Cho .............................. 714/6.1 |

FOREIGN PATENT DOCUMENTS

| JP | 2006-285943 | 10/2006 |
| JP | 2006-338691 | 12/2006 |
| JP | 2010-176305 | 8/2010 |
| JP | 2011-253576 | 12/2011 |

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

According to one embodiment, a disk storage apparatus includes a disk, a detector, and a controller. The disk includes a first recording area for recording with a first track density, and a second recording area for recording with a second track density lower than the first track density. The detector is configured to detect a variation of an outside environment. The controller is configured to select a nonvolatile memory or the second recording area as a storage destination of write data transferred from a host, based on a content of the variation of the outside environment detected by the detector, and a state of capability or incapability of storage of the nonvolatile memory.

16 Claims, 5 Drawing Sheets

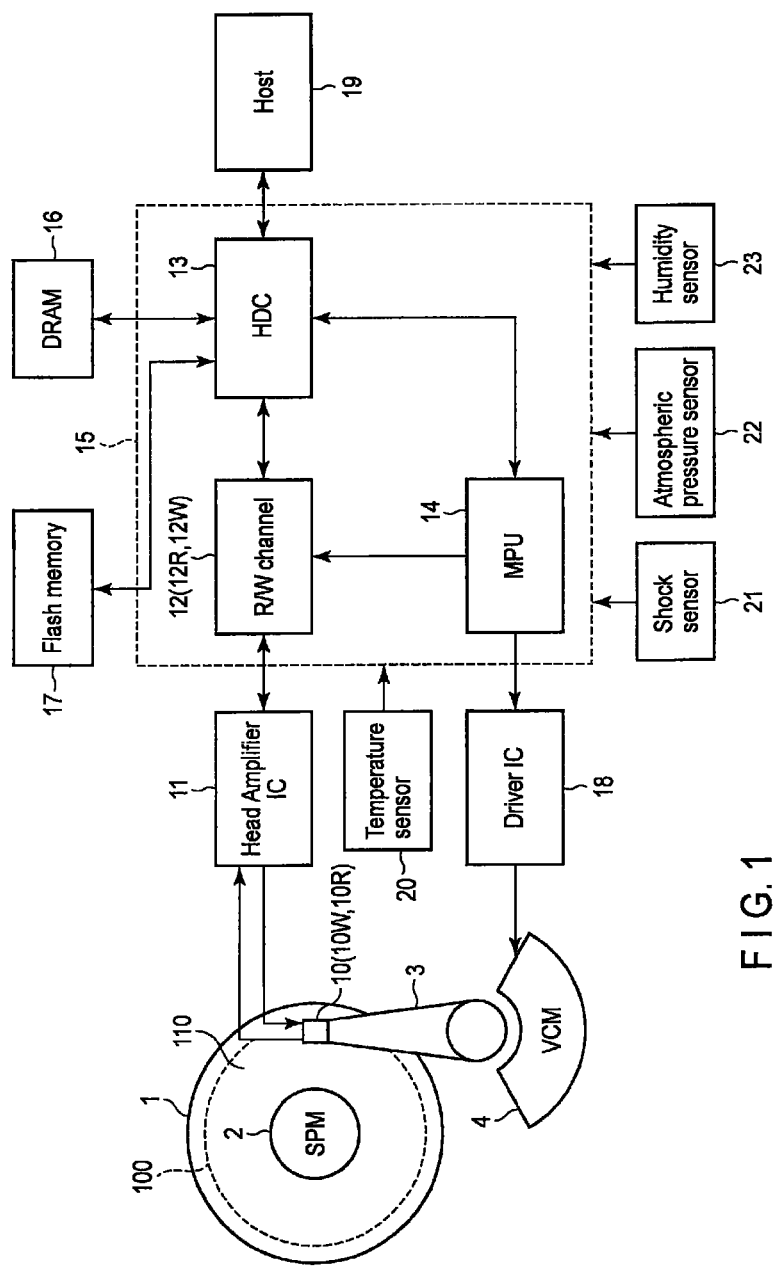
F I G. 1

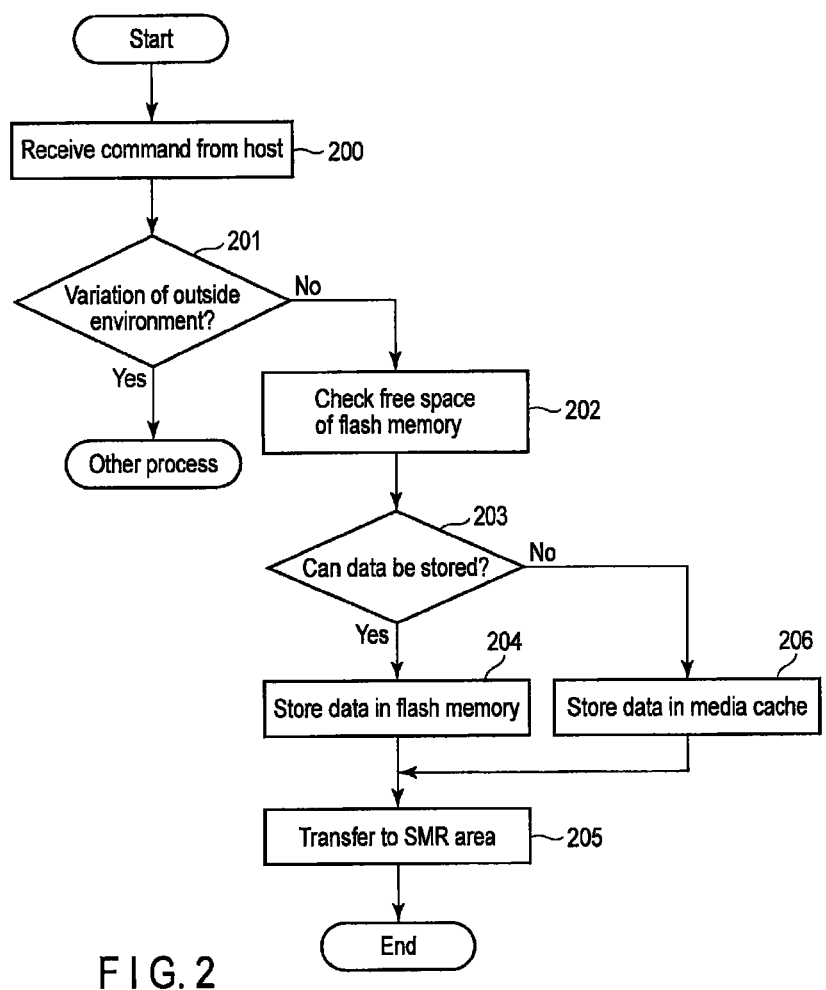
F I G. 2

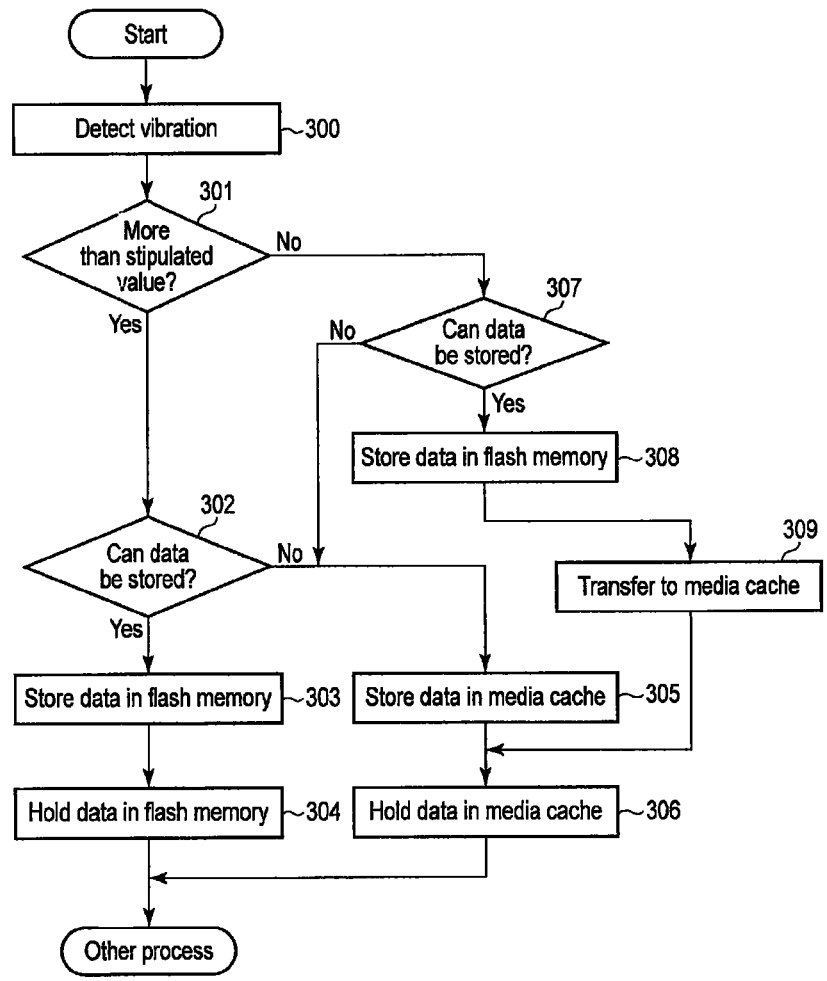
F I G. 3

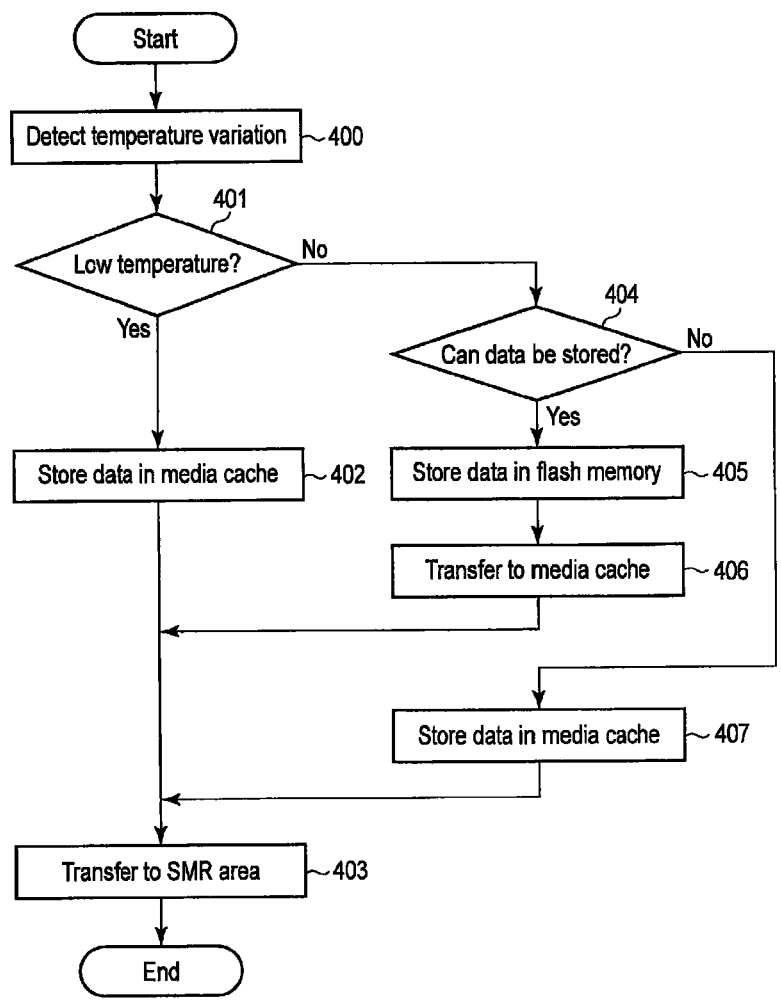
F I G. 4

DISK STORAGE APPARATUS AND DATA STORAGE METHOD

CROSS-REFERENCE TO RELATED APPLICATIONS

This application is based upon and claims the benefit of priority from Japanese Patent Application No. 2013-056854, filed Mar. 19, 2013, the entire contents of which are incorporated herein by reference.

FIELD

Embodiments described herein relate generally to a disk storage apparatus and a data storage method.

BACKGROUND

In recent years, in the field of disk drives represented by a hard disk drive (HDD), a large-capacity hybrid disk drive has been developed, which uses a flash memory (usually, a NAND-type flash memory) which is a nonvolatile memory, in addition to a disk, as data storage media.

Furthermore, there has been developed a disk drive to which a method of using a disk including a shingled write recording area, which is an area with a high track density (TPI), and a media cache area, which is a recording area with a relatively low track density (TPI), is applied. Hereinafter, the shingled write recording area is referred to as "SMR (shingled write magnetic recording) area".

Specifically, in the disk drive, write data from a host is stored in any one of data recording areas, namely an SMR area on the disk, a media cache area on the disk, and a flash memory.

The three data recording areas have different degrees of influence due to a variation of an outside environment, which represents an environment of the outside of the apparatus, such as vibration (impact), temperature, or atmospheric pressure. Accordingly, control is required to properly store write data, based on the variation of the outside environment.

BRIEF DESCRIPTION OF THE DRAWINGS

FIG. 1 is a block diagram illustrating the structure of a disk drive relating to a first embodiment;

FIG. 2 is a flowchart illustrating a basic data storage operation relating to the first embodiment;

FIG. 3 is a flowchart illustrating a data storage operation relating to the first embodiment;

FIG. 4 is a flowchart illustrating a data storage operation relating to a second embodiment.

DETAILED DESCRIPTION

Figure 5:
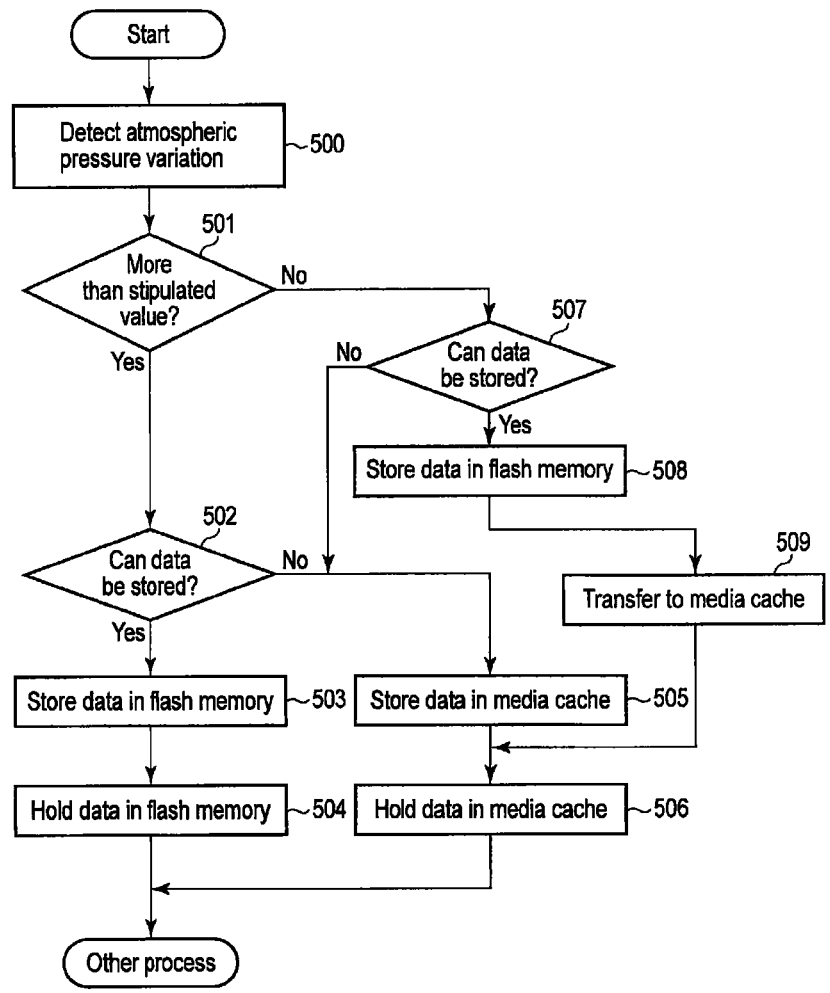
FIG. 5 is a flowchart illustrating a data storage operation relating to a third embodiment.

In general, according to one embodiment, a disk storage apparatus includes a disk, a nonvolatile memory, a detector, and a controller. The disk includes a first recording area for recording with a first track density, and a second recording area for recording with a second track density lower than the first track density. The detector is configured to detect a variation of an outside environment. The controller is configured to select the nonvolatile memory or the second recording area as a storage destination of write data transferred from a host, based on a content of the variation of the outside environment detected by the detector, and a state of capability or incapability of storage of the nonvolatile memory.

Various embodiments will be described hereinafter with reference to the accompanying drawings.

FIG. 1 is a block diagram illustrating a main part of a disk drive relating to an embodiment.

As shown in FIG. 1, the disk drive of the embodiment is a hybrid disk drive including, as storage media, a disk 1 and a flash memory 17 (NAND flash memory) 17. The disk drive includes, in general terms, a head-disk assembly (HDA), a head amplifier integrated circuit (hereinafter referred to as "head amplifier IC"), and a system controller 15 which is a one-chip integrated circuit.

The HDA includes, in addition to the disk 1, a spindle motor (SPM) 2, an arm 3 on which a head 10 is mounted, and a voice coil motor (VCM) 4. The disk 1 is rotated by the spindle motor 2. The arm 3 and VCM 4 constitute an actuator. The actuator is driven by the VCM 4 to control and move the head 10, which is mounted on the arm 3, to a designated position on the disk 1.

The head 10 has a slider as a main body, and includes a write head 10W and a read head 10R which are mounted on the slider. The read head 10R reads out data which is recorded on data tracks on the disk 1. The write head 10R writes data on the disk 1.

The head amplifier IC 11 includes a read amplifier and a write driver. The read amplifier amplifies a read signal which has been read by the read head 10R, and sends the amplified read signal to a read/write (R/W) channel 12. On the other hand, the write driver transmits a write current, which corresponds to write data that is output from the R/W channel 12, to the write head 10W.

The system controller 15 includes the R/W channel 12, a hard disk controller (HDC) 13 and a microprocessor (MPU) 14. The R/W channel 12 includes a read channel 12R which executes a signal process of read data, and a write channel 12W which executes a signal process of write data.

The HDC 13 controls data transfer between a host 19 and the R/W channel 12. The HDC 13 controls a buffer memory (DRAM) 16 and temporarily stores read data and write data in the buffer memory 16, thereby executing data transfer control. However, as will be described later, the HDC 13 normally stores write data, which is received from the host 19, in the flash memory 17, without intervention of the buffer 16. When write data cannot be stored in the flash memory 17, the HDC 13 temporarily stores the write data in the buffer memory 16.

The MPU 14 is a main controller, which controls the VCM 4 via the driver IC 18 and executes servo control to position the head 10. Further, the MPU 14 controls a write operation of data on the disk 1, and executes control to select a storage destination of write data which is transferred from the host 19, as will be described later.

The write operation by the control of the MPU 14 includes an SMR (shingled write magnetic recording) operation. A main data recording area on the disk 1 is an SMR area 110 in which data is written by the SMR operation. In addition, a data recording area, which is secured on, for example, an outer peripheral side on the disk 1, is a media cache area 100. The media cache area 100, compared to the SMR area 110 with a high track density, is a data recording area with a low track density, in which data is written by a normal write operation. The media cache area 100, together with the flash memory 17, is used as a temporary data recording area.

Besides, the disk drive of the embodiment includes various sensors for detecting a variation of an outside environment (an environment of the outside of the disk drive), such as temperature, vibration (impact), atmospheric pressure, humidity, etc. The variation of the outside environment is also called "disturbance" or "outside interference". Specifically, the sensors include a temperature sensor 20 which detects a variation in temperature, a shock sensor 21 which detects vibration (impact), an atmospheric pressure sensor 22 which detects a variation in atmospheric pressure, and a humidity sensor 23 which detects humidity.

[Data Storage Operation]

Referring to flowcharts of FIG. 2 and FIG. 3, a data storage operation of the embodiment is described.

To begin with, as shown in FIG. 2, in the disk drive, the HDC 13 receives a command (a write command in this example) which is transferred from the host 19 via an interface (block 200). The HDC 13 stores write data (hereinafter referred to simply as "data"), which is transferred following the command, in the flash memory 17 or buffer memory (DRAM) 16.

In the present embodiment, upon receiving the command, the MPU 14 determines the presence/absence of a variation (vibration or impact) of the outside environment of the disk drive, based on detection of the shock sensor 21 in this example (block 201). When a variation of the outside environment has occurred, control goes to a data storage operation illustrated in the flowchart of FIG. 3 (YES in block 201).

Next, a case in which there is no variation of the outside environment is described (NO in block 201). The HDC 13 checks a free space of the flash memory 17 (block 202). Basically, when the flash memory 17 has a free space, the HDC 13 stores data from the host 19 in the flash memory 17 (YES in block 203, block 204). Based on the operation state of the disk drive, the MPU 14 executes a flush process of transferring the data from the flash memory 17 to the SMR area 110 on the disk 1 (block 205).

On the other hand, when the free space of the flash memory 17 is insufficient, the HDC 13 temporarily stores the data in the buffer memory (DRAM) 16. The MPU 14 stores the data in the media cache area 100 via the buffer memory (DRAM) 16 (NO in block 203, block 206). Further, based on the operation state of the disk drive, the MPU 14 executes a flush process of transferring the data from the media cache area 100 to the SMR area 110 (block 205).

In the meantime, aside from the case in which the free space of the flash memory 17 is insufficient, when the HDC 13 is unable to access the flash memory 17 because of an internal process being executed, the HDC 13 temporarily stores data in the buffer memory (DRAM) 16. Alternatively, the HDC 13 directly writes data in the memory cache area 100, without intervention of the buffer memory (DRAM) 16.

Also in the case in which the life of the flash memory 17 reaches the limit, data is temporarily stored in the buffer memory (DRAM) 16, or data is directly written in the media cache area 100 without intervention of the buffer memory (DRAM) 16. Specifically, for example, this corresponds to a case in which the number of times of repetitive use of a certain location in the flash memory has been reached, and a case in which the error ratio of the same location has increased. Usually, as the condition under which the flash memory 17 cannot be used, there are plural factors, such as when the number of times of write has exceeded a threshold, and when the number of defects occurring subsequently has exceeded a threshold.

In this example, the cases in which data cannot be stored in the flash memory 17 are generally represented by the case in which the free space of the flash memory 17 is insufficient. Specifically, the check of the free space of the flash memory 17 is the check of capability/incapability of storage of the flash memory 17.

Next, referring to a flowchart of FIG. 3, a description is given of the case in which vibration (impact) has been applied to the disk drive as a variation of the outside environment.

The MPU 14 detects vibration (impact) in accordance with an output from the shock sensor 21 (block 300). Specifically, as shown in FIG. 2, this case corresponds to the case in which a variation has occurred in the outside environment of the disk drive (YES in block 201). The MPU 14 determines whether the vibration (impact) has exceeded a stipulated value (block 301). When the vibration (impact) is not greater than the stipulated value (within a permissible range), the MPU 14 executes an operation of storing data in the flash memory 17 (NO in block 301). In this case, although the access to the DRAM 16 and flash memory 17 is executed via the HDC 13, it is assumed, for the purpose of convenience, that the MPU 14 accesses the DRAM 16 and flash memory 17.

Specifically, when the flash memory 17 has a free space which can store data, the MPU 14 stores the data in the flash memory 17 (YES in block 307, block 308). In this case, since there is vibration (impact) even within the permissible range, the MPU 14 executes a flush process of transferring the data from the flash memory 17 to the media cache area 100, without using the SMR area 110 which is relatively susceptible to vibration (impact) (block 309). The MPU 14 causes the media cache area 100 to hold the data until there is no longer the detection from the shock sensor 21 or until a predetermined time has passed since there was no longer the detection (block 306).

In addition, when the free space of the flash memory 17 is insufficient, the MPU 14 selects the media cache area 100 and stores the data in the media cache area 100 (NO in block 307, block 305). In this case, too, the MPU 14 causes the media cache area 100 to hold the data (block 306). As a matter of course, if vibration (impact) is no longer detected, the MPU 14 executes, based on the operation state of the disk drive, the flush process of transferring the data from the media cache area 100 to the SMR area 110 (see block 206).

On the other hand, when the vibration (impact) exceeds the stipulated value (outside the permissible range), the MPU 14 executes an operation of selecting, as a data storage destination, the flash memory 17 which is robust to vibration (impact) (YES in block 301). Specifically, when the flash memory 17 has a free space which can store data, the MPU 14 stores the data in the flash memory 17 (YES in block 302, block 303).

The MPU 14 causes the flash memory 17 to hold the data until vibration (impact) is no longer detected or until a predetermined time has passed since there was no longer the detection (block 304). Thereafter, based on the operation state of the disk drive, the MPU 14 executes the flush process of transferring the data from the flash memory 17 to the SMR area 110 (see block 204, block 205).

However, when the free space of the flash memory 17 is insufficient, the MPU 14 stores the data in the media cache area 100 (NO in block 302, block 305). Accordingly, the MPU 14 causes the media cache area 100 to hold the data (block 306).

According to the present embodiment, when vibration (impact) has been applied to the disk drive as a variation of the outside environment, the risk of data loss increases in the write operation of data on the disk 1. Thus, the flash memory 17 is selected as a first priority as the data storage destination. In this case, the data can be held in the flash memory 17 until vibration (impact) is no longer detected or until a predetermined time has passed since there was no longer the detection. Specifically, write data can be properly stored in a data recording area, based on a variation of the outside environment.

In the meantime, when the free space of the flash memory 17 is insufficient, the media cache area 100 with a relatively low track density is selected as a second priority, and data is held in the media cache area 100. Thereby, since it is possible to avoid data write in the SMR area 110 having the highest risk of data loss due to occurrence of vibration (impact), the data can surely be stored.

Second Embodiment

FIG. 4 is a flowchart illustrating a data storage operation relating to a second embodiment. The structure of a disk drive relating to this embodiment is the same as shown in FIG. 1, so a description thereof is omitted here.

This embodiment relates to a data storage operation in a case where a temperature variation in the ambience of the disk drive has occurred as a variation of the outside environment of the disk drive. Specifically, as illustrated in FIG. 4, the MPU 14 detects a temperature variation in accordance with an output from the temperature sensor 20 (block 400). The MPU 14 determines whether the degree of temperature due to the temperature variation has exceeded a stipulated value (block 401). In this example, the case in which the temperature is in a low-temperature state below the stipulated value is regarded as "outside a permissible range", and the case in which the temperature is in a temperature state (approximately a normal temperature) of the stipulated value or above is regarded as "within a permissible range". However, in the present embodiment, it is assumed that a high-temperature state outside the permissible range is out of the scope of application.

If the determination result is within the permissible range (i.e. a state other than the low-temperature state below the stipulated value), the MPU 14 preferentially selects the flash memory 17 (NO in block 401). Specifically, when the flash memory 17 has a free space which can store data, the MPU 14 stores the data in the flash memory 17 (YES in block 404, block 405).

In this case, the MPU 14 executes a flush process of transferring the data from the flash memory 17 to the media cache area 100 (block 406). Thereafter, the MPU 14 executes, based on the operation state of the disk drive, a flush process of transferring the data from the media cache area 100 to the SMR area 110 (block 403). Incidentally, the MPU 14 may execute, based on the operation state of the disk drive, a flush process of transferring the data from the flash memory 17 to the SMR area 110.

In addition, when the free space of the flash memory 17 is insufficient, the MPU 14 selects the media cache area 100 and stores the data in the media cache area 100 (NO in block 404, block 407). Thereafter, the MPU 14 executes, based on the operation state of the disk drive, the flush process of transferring the data from the media cache area 100 to the SMR area 110 (block 403).

On the other hand, when the temperature is in the low-temperature state below the stipulated value ("outside the permissible range"), the MPU 14 preferentially selects the media cache area 100 as a data storage destination, and not the flash memory 17 whose write characteristics become unstable in a low-temperature environment (YES in block 401). Specifically, the MPU 14 stores the data in the media cache area 100 (block 402). Thereafter, the MPU 14 executes, based on the operation state of the disk drive, the flush process of transferring the data from the media cache area 100 to the SMR area 110 (block 403).

Specifically, when the ambient temperature environment of the disk drive has changed to a low-temperature state as a variation of the outside environment, the write characteristics of data write in the flash memory 17 become unstable, and the risk of data loss increases. Thus, according to the present embodiment, the media cache area 100 is preferentially selected as a data storage destination, and a data write process is executed. Accordingly, when a change has occurred to the low-temperature state, it is possible to avoid a data write operation in the flash memory 17. Therefore, the data can surely be stored by a write operation on the disk 1 which is stable with respect to a temperature variation.

In the meantime, when the data is to be transferred from the media cache area 100 to the SMR area 110, the data may be held in the media cache area 100 until the ambient temperature environment becomes stable.

Third Embodiment

FIG. 5 is a flowchart illustrating a data storage operation of a third embodiment. The structure of a disk drive relating to this embodiment is the same as shown in FIG. 1, so a description thereof is omitted here.

This embodiment relates to a data storage operation in a case where an atmospheric pressure variation of the disk drive has occurred as a variation of the outside environment of the disk drive. Specifically, as illustrated in FIG. 5, the MPU 14 detects an atmospheric pressure variation in accordance with an output from the atmospheric pressure sensor 22 (block 500). The MPU 14 determines whether an atmospheric pressure, which has varied, exceeds a range of a stipulated value (block 501). In this example, the case in which the atmospheric pressure is lower than the range of the stipulated value is regarded as "outside a permissible range", and the case in which the atmospheric pressure is within the range of the stipulated value or higher than this range is regarded as "within a permissible range".

If the determination result is within the permissible range, the MPU 14 preferentially selects the flash memory 17 (NO in block 501). Specifically, when the flash memory 17 has a free space which can store data, the MPU 14 stores the data in the flash memory 17 (YES in block 507, block 508).

In this case, when the atmospheric pressure is within the permissible range, the MPU 14 may execute a flush process of transferring the data from the flash memory 17 to the media cache area 100 (block 509). It should be noted, however, that the MPU 14 causes the media cache area 100 to hold the data until the atmospheric pressure restores to the normal state, without using the SMR area 110 whose write characteristics become unstable in a relatively reduced pressure environment (block 506).

In addition, when the free space of the flash memory 17 is insufficient, the MPU 14 selects the media cache area 100 and stores the data in the media cache area 100 (NO in block 507, block 505). The MPU 14 causes the media cache area 100 to hold the data until the atmospheric pressure restores to the normal state (block 506).

On the other hand, also in the case where the atmospheric pressure exceeds the range of the stipulated value and is outside the permissible range, the MPU 14 preferentially selects the flash memory 17 as a data storage destination (YES in block 501). Specifically, when the flash memory 17 has a free space which can store data, the MPU 14 stores the data in the flash memory 17 (YES in block 502, block 503).

In this case, the MPU 14 causes the flash memory 17 to hold the data until the atmospheric pressure restores to the normal state (block 504). At a time point when the atmospheric pressure has restored to the normal state, the MPU 14 may execute, based on the operation state of the disk drive, the flush process of transferring the data from the flash memory 17 to the SMR area 110 (see block 204, block 205).

However, when the free space of the flash memory 17 is insufficient, the MPU 14 selects the media cache area 100, and stores the data in the media cache area 100 (NO in block 502, block 505). The MPU 14 causes the media cache area 100 to hold the data (block 506). At a time point when the atmospheric pressure has restored to the normal state, the MPU 14 may execute, based on the operation state of the disk drive, the flush process of transferring the data from the media cache area 100 to the SMR area 110.

As has been described above, according to the present embodiment, when the atmospheric pressure environment of the disk drive has changed to a reduced-pressure state, which is outside the permissible range, as a variation of the outside environment, the write operation on the disk 1 becomes unstable. In particular, the write operation on the SMR area 110 with a high track density becomes unstable. Thus, the flash memory 17 is selected as a first priority as the data storage destination, and the data is written and held. In addition, when the free space of the flash memory 17 is insufficient, the media cache area 100 is selected as a second priority as the data storage destination.

Therefore, when the atmospheric pressure is outside the permissible range, the data can be stored in the flash memory 17 and the data write operation on the SMR area 110 can be avoided. In addition, with the second priority being placed on the media cache area 100, the data can surely be stored in the media cache area 100.

In a modification, the MPU 14 may execute a data storage operation in a case where a humidity variation in the ambience of the disk drive has occurred as a variation of the outside environment of the disk drive. Specifically, the MPU 14 detects a humidity variation in accordance with an output from the humidity sensor 23. When the degree of humidity is outside the permissible range, the flash memory 17 may preferentially be selected as the data storage destination. Needless to say, when the free space of the flash memory 17 is insufficient, the media cache area 100 may be selected as a second priority as the data storage destination, and the data may be held in the media cache area 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus, comprising:
    a disk includes a first recording area for recording with a first track density, and a second recording area for recording with a second track density lower than the first track density;
    a nonvolatile memory configured to be one of storage destinations of write data transferred from a host;
    a detector configured to detect a variation of an outside environment; and
    a controller configured to select the nonvolatile memory or the second recording area as the one of storage destinations of the write data, based on a content of the variation of the outside environment detected by the detector, and a state of capability or incapability for storage of the nonvolatile memory.

2. The disk storage apparatus of claim 1, wherein the controller is configured to select the nonvolatile memory or the second recording area as a first priority, based on the content of the variation of the outside environment, when the variation of the outside environment is outside a permissible range, and to select the second recording area as a second priority, when the nonvolatile memory is the first priority and the nonvolatile memory is incapable of storing data.

3. The disk storage apparatus of claim 2, wherein the controller is configured to select the nonvolatile memory as the first priority, when the variation of the outside environment, which is detected by the detector, is within the permissible range and the nonvolatile memory is capable of storing data.

4. The disk storage apparatus of claim 2, wherein the controller is configured to execute a process of transferring data, which has been recorded in the nonvolatile memory or the second recording area, to the first recording area, and to keep the data recorded in the nonvolatile memory or the second recording area as such, without executing the process of transferring the data to the first recording area, when the variation of the outside environment, which is detected by the detector, is outside the permissible range.

5. The disk storage apparatus of claim 4, wherein the controller is configured to execute the process of transferring the data, when the variation of the outside environment has shifted from outside the permissible range to within the permissible range.

6. The disk storage apparatus of claim 1, wherein the controller is configured to select the nonvolatile memory as a first priority when the content of the variation of the outside environment is vibration or an atmospheric pressure variation and the variation of the outside environment is outside a permissible range, and to select the second recording area as a second priority when the nonvolatile memory is incapable of storing data.

7. The disk storage apparatus of claim 1, wherein the controller is configured to select the second recording area as a first priority when the content of the variation of the outside environment is a temperature variation and the variation of the outside environment is outside a permissible range.

8. The disk storage apparatus of claim 7, wherein the controller is configured to transfer data, which has been recorded in the second recording area, to the first recording area.

9. A method of storing data in a disk storage apparatus, which comprises a disk including a first recording area for recording with a first track density, and a second recording area for recording with a second track density lower than the first track density, a nonvolatile memory configured to be one of storage destinations of write data transferred from a host, and a detector configured to detect a variation of an outside environment, the method comprising:
    receiving write data transferred from a host; and
    selecting the nonvolatile memory or the second recording area as the one of storage destinations of the write data, based on a content of the variation of the outside environment detected by the detector, and a state of capability or incapability of storage of the nonvolatile memory.

10. The method of claim 9, further comprising:
    selecting the nonvolatile memory or the second recording area as a first priority, based on the content of the variation of the outside environment, when the variation of the outside environment is outside a permissible range; and selecting the second recording area as a second priority, when the nonvolatile memory is the first priority and the nonvolatile memory is incapable of storing data.

11. The method of claim 10, further comprising:

selecting the nonvolatile memory as the first priority, when the variation of the outside environment, which is detected by the detector, is within the permissible range and the nonvolatile memory is capable of storing data.

12. The method of claim 10, further comprising:

executing a process of transferring data, which has been recorded in the nonvolatile memory or the second recording area, to the first recording area; and keeping the data recorded in the nonvolatile memory or the second recording area as such, without executing the process of transferring the data to the first recording area, when the variation of the outside environment, which is detected by the detector, is outside the permissible range.

13. The method of claim 12, further comprising:

executing the process of transferring the data, when the variation of the outside environment has shifted from outside the permissible range to within the permissible range.

14. The method of claim 9, further comprising:

selecting the nonvolatile memory as a first priority when the content of the variation of the outside environment is vibration or an atmospheric pressure variation and the variation of the outside environment is outside a permissible range; and selecting the second recording area as a second priority when the nonvolatile memory is incapable of storing data.

15. The method of claim 9, further comprising:

selecting the second recording area as a first priority when the content of the variation of the outside environment is a temperature variation and the variation of the outside environment is outside a permissible range.

16. The method of claim 15, further comprising:

transferring data, which has been recorded in the second recording area, to the first recording area.

\* \* \* \* \*